US012640425B2

(12) United States Patent
Kim et al.

(10) Patent No.: US 12,640,425 B2
(45) Date of Patent: May 26, 2026

(54) SECONDARY BATTERY

(71) Applicant: Samsung SDI Co., Ltd., Yongin-si (KR)

(72) Inventors: Dae Kyu Kim, Yongin-si (KR); Sung Gwi Ko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 652 days.

(21) Appl. No.: 17/593,895

(22) PCT Filed: Mar. 11, 2020

(86) PCT No.: PCT/KR2020/003379
§ 371 (c)(1),
(2) Date: Sep. 27, 2021

(87) PCT Pub. No.: WO2020/204385
PCT Pub. Date: Oct. 8, 2020

(65) Prior Publication Data
US 2022/0190418 A1 Jun. 16, 2022

(30) Foreign Application Priority Data
Apr. 1, 2019 (KR) ........................ 10-2019-0037997

(51) Int. Cl.
*H01M 50/213* (2021.01)
*H01M 50/147* (2021.01)
(Continued)

(52) U.S. Cl.
CPC ....... *H01M 50/213* (2021.01); *H01M 50/147* (2021.01); *H01M 50/167* (2021.01);
(Continued)

(58) Field of Classification Search
CPC ............. H01M 50/213; H01M 50/167; H01M 50/572; H01M 50/578; H01M 50/179;
(Continued)

(56) References Cited

U.S. PATENT DOCUMENTS 7,335,439 B2    2/2008  Kawano et al.
8,986,876 B2    3/2015  Kim
(Continued)

FOREIGN PATENT DOCUMENTS

CN          1832228 A     9/2006
CN        201708194 U     1/2011
(Continued)

OTHER PUBLICATIONS

English Machine Translation for KR-20060086125-A (Year: 2006).*
(Continued)

*Primary Examiner* — Matthew T Martin
*Assistant Examiner* — Katherine N Higgins
(74) *Attorney, Agent, or Firm* — Womble Bond Dickinson (US) LLP

(57) ABSTRACT

The present invention relates to a secondary battery, wherein an electrode tab of an electrode assembly and a pack tab for modularization are electrically connected by a cap-up without any other configuration, so as to reduce resistance and heat generation, which may occur on a current path. For this purpose, a secondary battery is disclosed, the secondary battery including: a cylindrical can having an upper end opening; an electrode assembly received in the cylindrical can and having an electrode tab; and a cap assembly for sealing the upper end opening of the cylindrical can. The cap assembly includes: a circular-plate-shaped safety plate having a bent which is broken when the pressure inside the cylindrical can increases; and a cap-up disposed on the upper portion of the safety plate and surrounding the edge (Continued)

portion of the safety plate, and the electrode tab is in contact with and coupled to the cap-up.

8 Claims, 9 Drawing Sheets

(51) Int. Cl.

| | |
|---|---|
| *H01M 50/167* | (2021.01) |
| *H01M 50/179* | (2021.01) |
| *H01M 50/271* | (2021.01) |
| *H01M 50/536* | (2021.01) |
| *H01M 50/572* | (2021.01) |
| *H01M 50/578* | (2021.01) |

(52) U.S. Cl.
CPC ....... *H01M 50/179* (2021.01); *H01M 50/271* (2021.01); *H01M 50/572* (2021.01); *H01M 50/578* (2021.01); *H01M 50/536* (2021.01); *H01M 2200/20* (2013.01)

(58) Field of Classification Search
CPC ............ H01M 50/147; H01M 50/271; H01M 50/536; H01M 2200/20
See application file for complete search history.

(56) References Cited

U.S. PATENT DOCUMENTS

| | | | |
|---|---|---|---|
| 9,147,864 | B2 | 9/2015 | Jang et al. |
| 10,103,370 | B2 | 10/2018 | Kunoike et al. |
| 10,622,608 | B2 | 4/2020 | Ko et al. |
| 2004/0191610 | A1 | 9/2004 | Yoppolo et al. |
| 2004/0234842 | A1 | 11/2004 | Kawano et al. |
| 2006/0204841 | A1* | 9/2006 | Satoh .................. H01M 50/533 29/623.2 |
| 2009/0117451 | A1* | 5/2009 | Jung ................. H01M 50/3425 429/56 |
| 2009/0208830 | A1* | 8/2009 | Okabe ................. H01M 50/538 29/623.2 |
| 2009/0233157 | A1* | 9/2009 | Kim ..................... H01M 50/167 429/53 |
| 2009/0233160 | A1 | 9/2009 | Kim |
| 2010/0136374 | A1* | 6/2010 | Jang ..................... H01M 10/425 429/174 |
| 2010/0159288 | A1 | 6/2010 | Kim |
| 2015/0364734 | A1 | 12/2015 | Kunoike et al. |
| 2017/0301899 | A1 | 10/2017 | Lee et al. |
| 2017/0309880 | A1* | 10/2017 | Ko ...................... H01M 50/167 |

FOREIGN PATENT DOCUMENTS

| | | | | |
|---|---|---|---|---|
| CN | 204464332 | U | 7/2015 | |
| CN | 104956515 | A | 9/2015 | |
| CN | 107302062 | A | 10/2017 | |
| CN | 208507743 | U | 2/2019 | |
| JP | 2001-006653 | A | 1/2001 | |
| JP | 2004-273229 | A | 9/2004 | |
| JP | 2017-183619 | A | 10/2017 | |
| JP | 6254102 | B2 | 12/2017 | |
| KR | 20060086125 | A * | 7/2006 | .......... H01M 50/166 |
| KR | 10-2010-0070677 | A | 6/2010 | |
| KR | 10-1036071 | B1 | 5/2011 | |
| KR | 10-2016-0084145 | A | 7/2016 | |
| KR | 10-2017-0120979 | | 11/2017 | |
| KR | 10-2018-0005455 | A | 1/2018 | |
| KR | 10-2018-0018280 | A | 2/2018 | |
| WO | WO 2011/003367 | A1 | 1/2011 | |
| WO | WO 2018/030836 | A1 | 2/2018 | |

OTHER PUBLICATIONS

Chinese Office Action with English translation for CN Application No. 202080038264.X dated Feb. 12, 2023, 22 pages.
International Search Report, with English translation, dated Jun. 10, 2020, for corresponding PCT/KR2020/003379 (5 pages).
Chinese Notice of Allowance dated Mar. 1, 2024, issued in corresponding Chinese Patent Application No. 202080038264.X (4 pages).
Korean Office Action dated Jun. 19, 2024, issued in corresponding Korean Patent Application No. 10-2019-0037997, 4 pages.

* cited by examiner

SECONDARY BATTERY

CROSS-REFERENCE TO RELATED APPLICATIONS

This application is a U.S. National Phase Patent Application of International Application Number PCT/KR2020/003379, filed on Mar. 11, 2020, which claims priority to Korean Patent Application Number 10-2019-0037997, filed on Apr. 1, 2019, the entire content of both of which is incorporated herein by reference.

TECHNICAL FIELD

Various embodiments of the present invention relate to a secondary battery.

BACKGROUND ART

A secondary battery is a power storage system that provides excellent energy density for converting electrical energy into chemical energy and storing same. Compared to primary batteries that are not rechargeable, secondary batteries are rechargeable and are widely used in IT devices such as smartphones, cellular phones, laptops, and tablet PCs. Recently, interest in electric vehicles has increased to prevent environmental pollution, and thus, high-capacity secondary batteries are being adopted for electric vehicles. Such secondary batteries are required to have characteristics such as high density, high output, and stability.

The above information disclosed in this Background section is only for enhancement of understanding of the background of the invention and therefore it may contain information that does not constitute prior art.

DESCRIPTION OF EMBODIMENTS

Technical Problem

Various embodiments of the present invention relate to a secondary battery, wherein an electrode tab of an electrode assembly and a pack tab for modularization are electrically connected by a cap-up without any other configuration, so as to reduce resistance and heat generation, which may occur on a current path.

Solution to Problem

Various embodiments of the present invention provide a secondary battery including a cylindrical can having an upper end opening, an electrode assembly received in the cylindrical can and having an electrode tab, and a cap assembly for sealing the upper end opening of the cylindrical can. The cap assembly includes: a circular-plate-shaped safety plate having a bent, and a cap-up disposed on the upper portion of the safety plate and surrounding the edge portion of the safety plate, and the electrode tab is in contact with and coupled to the cap-up.

The cap-up may include a terminal portion in the shape of a flat circular plate, a connection portion that is bent downwardly from an edge of the terminal portion, a first extension portion that extends outwardly from a lower end of the connection portion in the horizontal direction, a bent portion that is bent downwardly from an edge of the first extension portion, and a second extension portion that extends inwardly from a lower end of the bent portion in the horizontal direction.

The edge portion of the safety plate may have an upper surface in contact with the first extension portion, a side surface in contact with the bent portion, and a lower surface in contact with the second extension portion.

The edge portion of the safety plate may be interposed between the first extension portion of the cap-up and the second extension portion parallel to the first extension portion.

The second extension portion may include a plurality of slits that are cut from the upper end to the lower end.

The safety plate may have a circular ring-shaped groove in which the vent is located under the terminal portion and is formed in a downward direction from the top surface.

The connection portion may have at least one opening.

The electrode tab may be welded to the second extension portion.

The safety plate may include a central portion that has a flat circular plate shape and includes the vent formed on the upper surface thereof, a stepped portion that is bent downwardly from the edge portion of the central portion; and an edge portion that extends outwardly from the lower end of the stepped portion.

The cap assembly may further include an insulating gasket interposed between the cap-up and the cylindrical can.

Advantageous Effects of Disclosure

Various embodiments of the present invention provide a secondary battery, wherein an electrode tab of an electrode assembly and a pack tab for modularization are electrically connected by a cap-up without any other configuration, so as to reduce resistance and heat generation, which may occur on a current path.

BEST MODE

Figure 1A:
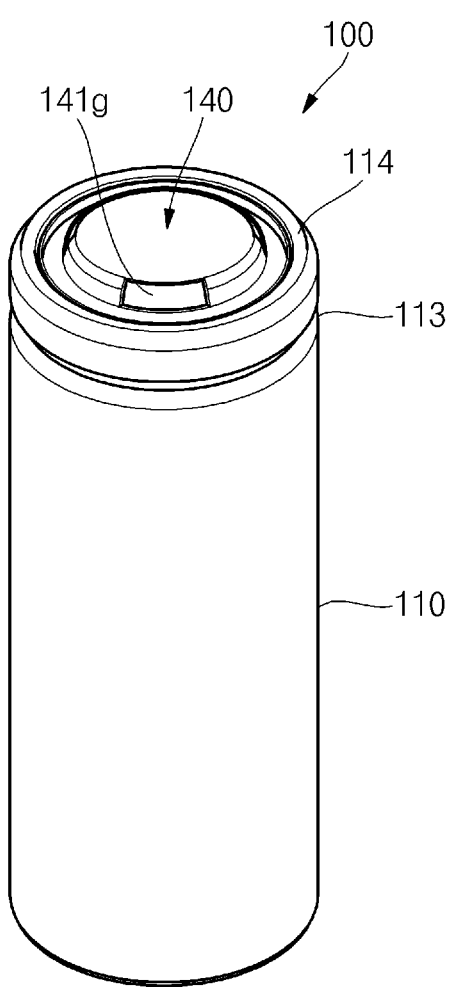
FIGS. 1A and 1B are a perspective view and a cross-sectional view illustrating a secondary battery according to an embodiment of the present invention.

Hereinafter, example embodiments of the present disclosure will be described in detail.

Embodiments of the present invention are provided to more completely explain the present invention to one skilled in the art, and the following example embodiments may be modified in various other forms and the present invention should not be construed as being limited to the embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or and/or "comprising" when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1B:
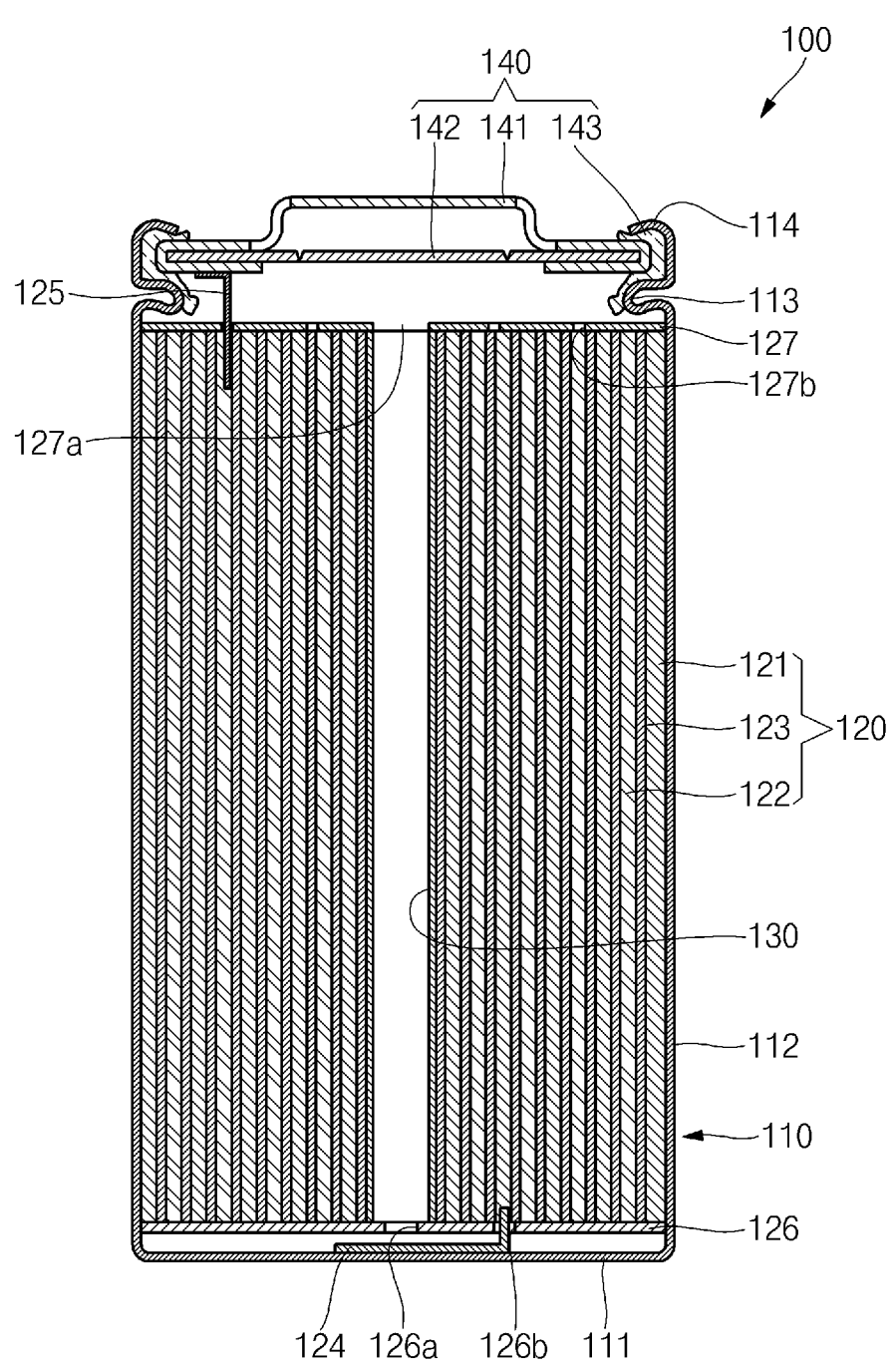

FIG. 1A shows a perspective view illustrating a secondary battery 100 according to an embodiment of the present invention, and FIG. 1B shows a longitudinal cross-sectional view illustrating the secondary battery 100 shown in FIG. 1A. Here, the longitudinal cross-section is a cross-section of the secondary battery 100 cut in the longitudinal direction.

As illustrated in FIGS. 1A and 1B, the secondary battery 100 according to the present invention includes a cylindrical can 110, an electrode assembly 120 accommodated in the cylindrical can 110, and a cap assembly 140 sealing the upper opening of the cylindrical can 110. In addition, the present invention may further include a center pin 130 coupled to the electrode assembly 120.

The cylindrical can 110 includes a circular bottom portion 111 and a side portion 112 extending a predetermined length upward from the bottom portion 111. During the manufacturing process of the secondary battery, the upper part of the cylindrical can 110 is opened. Therefore, during the assembly process of the secondary battery, the electrode assembly 120 may be inserted into the cylindrical can 110 together with the electrolyte. The cylindrical can 110 may be formed of steel, a steel alloy, aluminum, an aluminum alloy, or an equivalent thereof, but the material thereof is not limited thereto. In addition, the cylindrical can 110 may have an inwardly recessed beading part 113 formed under the cap assembly 140 to prevent the cap assembly 140 from being separated to the outside, and an inwardly bent crimping part 114 formed on the cap assembly 140.

The electrode assembly 120 is accommodated in the cylindrical can 110. The electrode assembly 120 may include two electrode tabs 124 and 125 protruding in upper and lower directions, respectively. The electrode assembly 120 may include a negative electrode plate 121 coated with a negative active material (e.g., graphite, carbon, etc.), a positive electrode plate 122 coated with a positive active material (e.g., transition metal oxide (LiCoO2, LiNiO2, LiMn2O4, etc.)), and a separator 123 positioned between the negative electrode plate 121 and the positive electrode plate 122 to prevent a short circuit and allow only movement of lithium ions. The negative electrode plate 121, the positive electrode plate 122, and the separator 123 are wound in a substantially cylindrical shape. Here, the negative electrode plate 121 may be a copper (Cu) or nickel (Ni) foil, the positive electrode plate 122 may be an aluminum (Al) foil, and the separator 123 may be made of polyethylene (PE) or polypropylene (PP), but the present invention is not limited thereto. In addition, a negative electrode tab 124 protruding downward by a predetermined length may be welded to the negative electrode plate 121, and a positive electrode tab 125 protruding upward by a predetermined length may be welded to the positive electrode plate 122, but vice versa. In addition, the negative electrode tab 124 may be made of copper or nickel, and the positive electrode tab 125 may be made of aluminum, but the present invention is not limited thereto.

Also, the negative electrode tab 124 of the electrode assembly 120 may be welded to the bottom portion 111 of the case 110. Accordingly, the case 110 may operate as a negative electrode. Of course, on the contrary, the positive electrode tab 125 may be welded to the bottom portion 111 of the case 110, and in such a case, the case 110 may operate as a positive electrode.

In addition, a first insulating plate 126 that is coupled to the cylindrical can 110 and has a first hole 126a in the center and a second hole 126b on the exterior side thereof may be disposed between the electrode assembly 120 and the bottom portion 111. The first insulating plate 126 serves to prevent the electrode assembly 120 from electrically contacting the bottom portion 111 of the cylindrical can 110. Specifically, the first insulating plate 126 serves to prevent the positive electrode plate 122 of the electrode assembly 120 from electrically contacting the bottom portion 111. Here, when a large amount of gas is generated due to an abnormality in the secondary battery, the first hole 126a serves to allow the gas to quickly move upward through the center pin 130, and the second hole 126b serves to allow the negative electrode tab 124 to penetrate therethrough to then be welded to the bottom portion 111.

In addition, a second insulating plate 127 that is coupled to the cylindrical can 110 and has a first hole 127a in the center and a second hole 127b on the exterior side thereof may be disposed between the electrode assembly 120 and the cap assembly 140. The second insulating plate 127 serves to prevent the electrode assembly 120 from electrically contacting the cap assembly 140. Specifically, the second insulating plate 127 serves to prevent the negative electrode plate 121 of the electrode assembly 120 from electrically contacting the cap assembly 140. Here, when a large amount of gas is generated due to an abnormality in the secondary battery, the first hole 127a serves to allow the gas to quickly move toward the cap assembly 140, and the second hole 127b serves to allow the positive electrode tab 125 to penetrate therethrough to then be welded to the cap-up 141. In addition, the remaining second holes 127b serve to allow the electrolyte to quickly flow into the electrode assembly 120 in an electrolyte injection process.

In addition, the diameters of the first holes 126a and 127a of the first and second insulating plates 126 and 127 are smaller than the diameter of the center pin 130, and thus prevents the center pin 130 from electrically contacting the bottom portion 111 of the cylindrical can 110 or the cap assembly 140 due to an external impact.

The center pin 130 has a hollow circular pipe shape, and may be coupled to the approximately center of the electrode assembly 120. The center pin 130 may be formed of steel, a steel alloy, aluminum, an aluminum alloy, or polybutylene terephthalate, but the material thereof is not limited thereto. The center pin 130 serves to suppress deformation of the electrode assembly 120 during charging and discharging of the battery, and serves as a passage for gas generated inside the secondary battery. In some cases, the center pin 130 may be omitted.

The cap assembly 140 includes a cap-up 141 having a plurality of through-holes 141d formed therein, a safety plate 142 installed under the cap-up 141, and an insulating gasket 143 for insulating the cap-up 141 from the side portion 111 of the cylindrical can 110. The cap-up 141 may surround the edge portion of the safety plate 142. In addition, the cap-up 141 may have a lower surface thereof contacting the positive electrode tab 125 to then be welded thereto. The configuration and coupling relationship of the cap-up 141 and the safety plate 142 will be described in detail below.

Here, the insulating gasket 143 is substantially formed along the beading part 113 and the crimping part 114 formed on the side portion 111 of the cylindrical can 110, and thus is compressed between the cap-up 141 and the insulating gasket 143. That is, the insulating gasket 143 may be interposed between the cap-up 141 and the beading part 113 and between the cap-up 141 and the crimping part 114 in a compressed state. In addition, through-holes 141g formed in the cap-up 141 serve to discharge the internal gas to the outside when an abnormal internal pressure is generated inside the cylindrical can 110. Of course, the vent 142a of the safety plate 142 is first ruptured and torn by the internal pressure, and the gas inside is released to the outside.

The cap assembly 140 may be formed of any one selected from general aluminum, aluminum alloy, steel, steel alloy, nickel, nickel alloy, and equivalents thereof, and the material thereof is not limited in the present invention.

In addition, an electrolyte (not shown) is injected into the cylindrical can 110, and this allows for movement of lithium ions generated by electrochemical reactions in the negative electrode plate 121 and the positive electrode plate 122 inside the battery during charging and discharging. The electrolyte may be a non-aqueous organic electrolyte that is a mixture of a lithium salt and a high-purity organic solvent. In addition, the electrolyte may be a polymer using a polymer electrolyte or a solid electrolyte, and the type of the electrolyte is not limited thereto.

Figure 2:
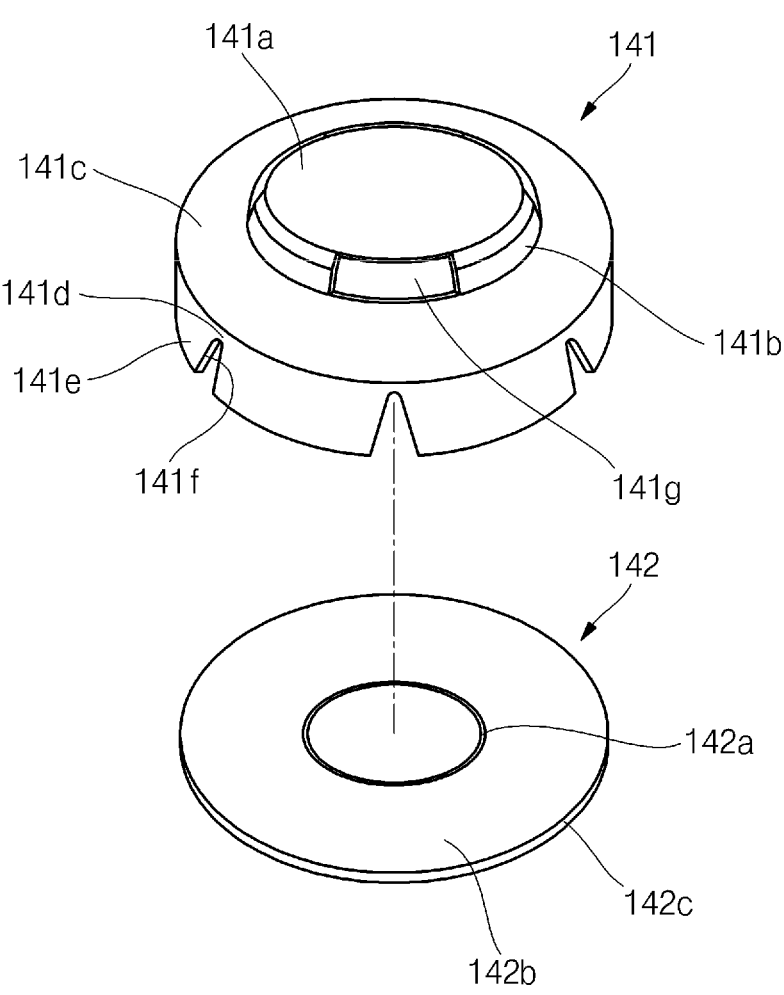
FIG. 2 is an exploded perspective view illustrating an enlarged view of a cap assembly of the secondary battery shown in FIGS. 1A and 1B before a cap-up and a safety plate are coupled.
Figure 3A:
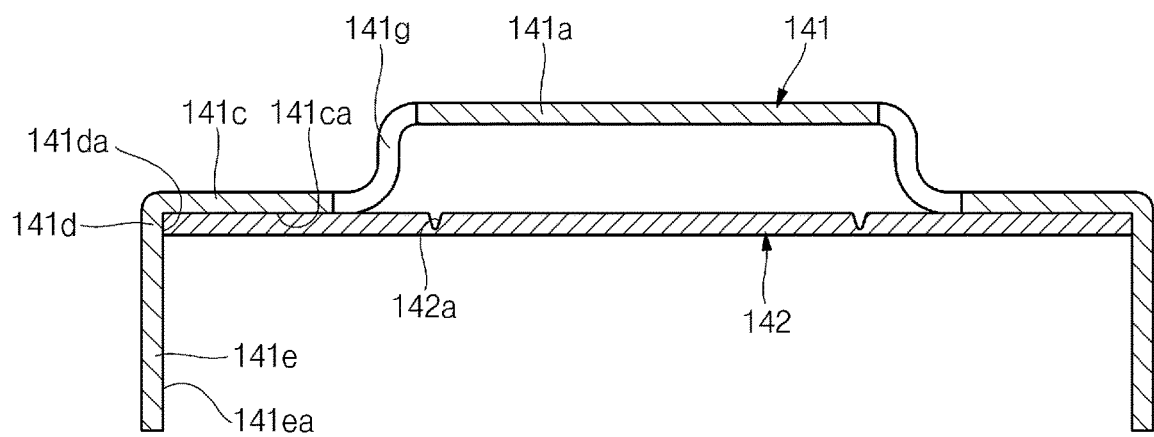
FIGS. 3A and 3B are a cross-sectional view in which the safety plate is inserted into the cap-up shown in FIG. 2 and a cross-sectional view in which the cap-up and the safety plate are coupled.

Referring to FIG. 2, an exploded perspective view illustrating an enlarged view of a cap assembly of the secondary battery 100 shown in FIGS. 1A and 1B before a cap-up 141 and a safety plate 142 are coupled is illustrated. Referring to FIG. 3A, a cross-sectional view in which the safety plate 142 is inserted into the cap-up 141 shown in FIG. 2 is illustrated, and referring to FIG. 3B, a cross-sectional view in which the cap-up 141 and the safety plate 142 are coupled is illustrated. In addition, referring to FIG. 4, a bottom view in which the cap-up 141 shown in FIG. 3B and the safety plate 142 are coupled is illustrated.

Hereinafter, the configuration and coupling relationship of the cap-up 141 and the safety plate 142 will be described with reference to FIGS. 2, 3A, 3B and 4.

The cap-up 141 includes a terminal portion 141a, a connection portion 141b, an extension portion 141c, a bent portion 141d, and a second extension portion 141e sequentially positioned in an outward direction from the center.

The terminal portion 141a may be approximately flat and may be located approximately at the center of the cap-up 141. In addition, when a plurality of secondary batteries 100 are connected in series or in parallel to then be modularized, a pack tab (PT) for connecting between the plurality of secondary batteries 100 is welded to the upper surface of the terminal portion 141a.

The connection portion 141b is formed by bending downwardly from an edge portion of the terminal portion 141a, and includes at least one opening 141g. The opening 141g releases the gas inside the cylindrical can 110 to the outside when the vent 142a of the safety plate 142 is ruptured.

In addition, the first extension portion 141c may extend outwardly from the lower end of the connection portion 141b in the horizontal direction. The first extension portion 141c may have a horizontal size larger than that of the safety plate 142. The first extension portion 141c may have a lower surface 141ca in contact with the upper surface 142ba of the edge portion 142b of the safety plate 142.

In addition, the bent portion 141d may be bent substantially vertically downward from the edge portion of the first extension portion 141c. The inner surface 141da of the bent portion 141d may be in contact with the side surface 142c of the safety plate 142.

Also, the second extension portion 141e may extend from the lower end of the bent portion 141d in the inward horizontal direction. The second extension portion 141e may maintain a state in which it extends downward from the lower end of the bent portion 141d as shown in FIGS. 2 and 3A before being coupled to the safety plate 142. In addition, the second extension portion 141e may be bent toward the lower surface 142bb of the safety plate 142 in a state in which the safety plate 142 is in contact with the lower surface 141*ca* of the first extension portion 141*c* and the inner surface 141*da* of the bent portion 141*d*. Here, the upper surface 141*ea* of the second extension portion 141*e* may be in contact with the lower surface 142*bb* of the safety plate 142. In addition, the edge portion 142*b* of the safety plate 142 may be interposed between the first extension portion 141*c* and the second extension portion 141*e*. The second extension portion 141*e* may be parallel to the first extension portion 141*c*.

Figure 3B:
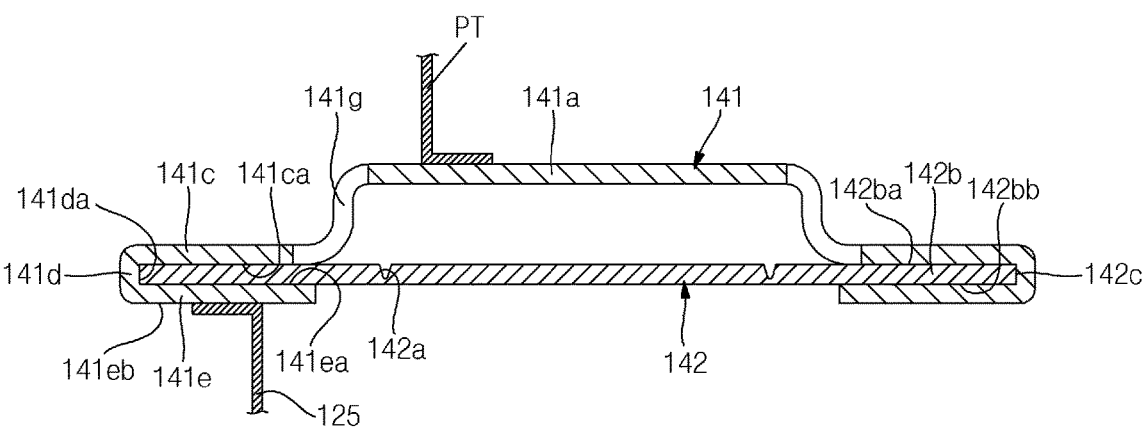
Figure 4:
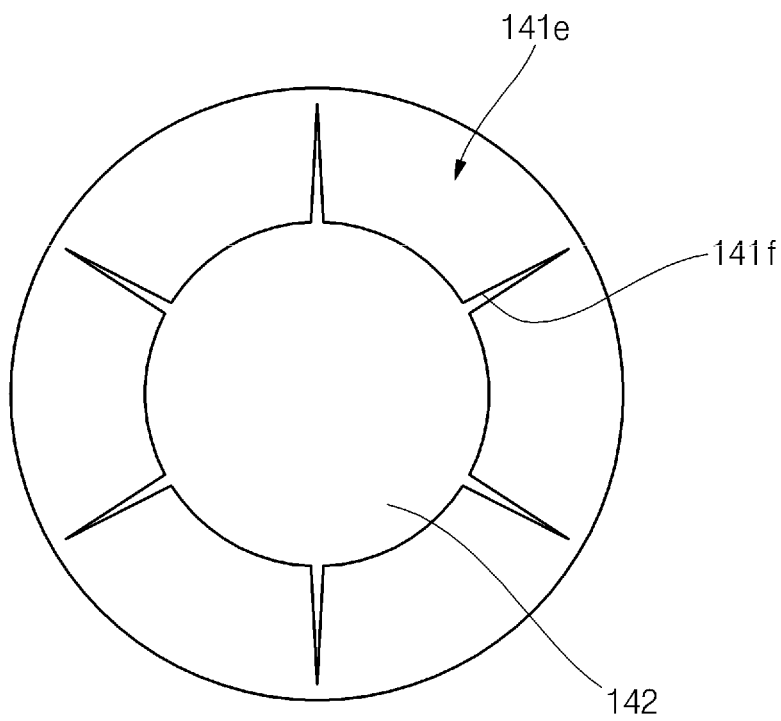
FIG. 4 is a bottom view in which the cap-up shown in FIG. 3B and the safety plate are coupled.

The second extension portion 141*e* may include a plurality of slits 141*f*. The plurality of slits 141*f* may be cut from the upper portion to the lower end of the second extension portion 141*e*. In addition, the plurality of slits 141*f* may be more spaced apart from each other in the lower part than in the upper part. The plurality of slits 141*f* may be provided to prevent the second extension portion 141*e* from overlapping or wrinkling when the second extension portion 141*e* is bent toward the lower surface of the safety plate 142. After the cap-up 141 and the safety plate 142 are coupled to each other, as shown in FIGS. 3B and 4, the second extension portion 141*e* can be brought into close contact with the edge portion 142*b* of the safety plate 142 by the plurality of slits 141*f* to then be kept flat. Although six of the plurality of slits 141*f* are shown in FIGS. 2 and 4, the number of the plurality of slits 141*f* may be any one of four or more, and the present invention does not limit the number of the plurality of slits 141*f*. However, for the convenience of the bending process of the second extension portion 141*e*, four or six slits are preferably formed.

In addition, the second extension portion 141*e* may have the positive electrode tab 125 of the electrode assembly 120 welded to the lower surface 141*eb*. That is, the positive electrode tab 125 and the pack tab PT may be electrically connected only with the cap-up 141 without any other configuration.

The safety plate 142 may have a substantially flat circular plate shape. The safety plate 142 may include a vent 142*a*, which is a groove formed in the downward direction from an upper surface. The vent 142*a* may be formed in a circular ring on the approximately central portion of the safety plate 142. The vent 142*a* may be located under the terminal portion 141*a* of the cap-up 141. The region where the vent 142*a* is formed may have a smaller thickness than other portions of the safety plate 142. When the pressure inside the cylindrical can 110 increases due to an internal short circuit or overcharge/discharge, the vent 142*a* may be ruptured by the pressure. The safety plate 142 may release the internal gas through the opening 141*g* of the cap-up 141 to the outside while the vent 142*a* is torn by the internal pressure of the cylindrical can 110.

In addition, the safety plate 142 may have an edge portion 142*b* interposed between the first extension portion 141*c* and the second extension portion 141*e*. Also, the edge portion 142*b* may have an upper surface, a side surface, and a lower surface surrounded by the first extension portion 141*c*, the bent portion 141*d*, and the second extension portion 141*e*.

Since the secondary battery 100 of the present invention is electrically connected between the positive electrode tab 125 of the electrode assembly 120 and the pack tab PT for modularization by the cap-up 141 without any other configuration, heat generation due to increased resistance, which may occur on a current path, can be reduced.

Figure 5A:
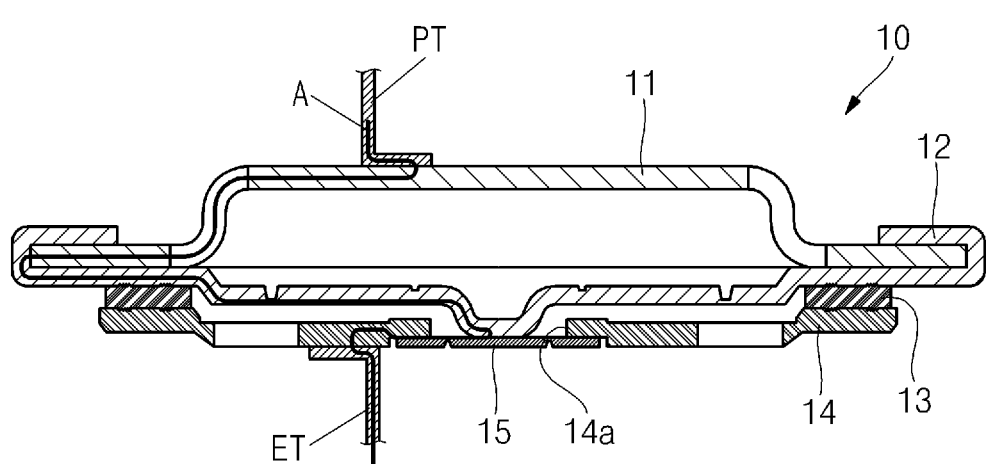
FIGS. 5A to 5C are a diagram illustrating a configuration of a cap assembly of Comparative Example, a graph illustrating the result of measuring the heating state of the cap assembly of Comparative Example and a temperature change according to current, and a graph illustrating the result of measuring the heating state of the secondary battery shown in FIGS. 1A to 4 by using a thermal imaging camera and a temperature change according to current.

For example, a cap assembly 10 of Comparative Example, as shown in FIG. 5A, may include a cap-up 11 having a plurality of through-holes 11*a* formed therein, a safety plate 12 installed under the cap-up 11, a connecting ring 13 installed under the safety plate 12, a cap-down 14 coupled to the connecting ring 13 and having a through-hole 14*a* formed therein, and a sub-plate 15 fixed to the lower portion of the through-hole 14*a* of the cap-down 14. In the cap assembly 10, a pack tab PT may be welded to a substantially central upper surface of the cap-up 11, and a positive electrode tab ET of the electrode assembly may be welded to the lower surface of the cap down 14.

Figures 5B, 5C:
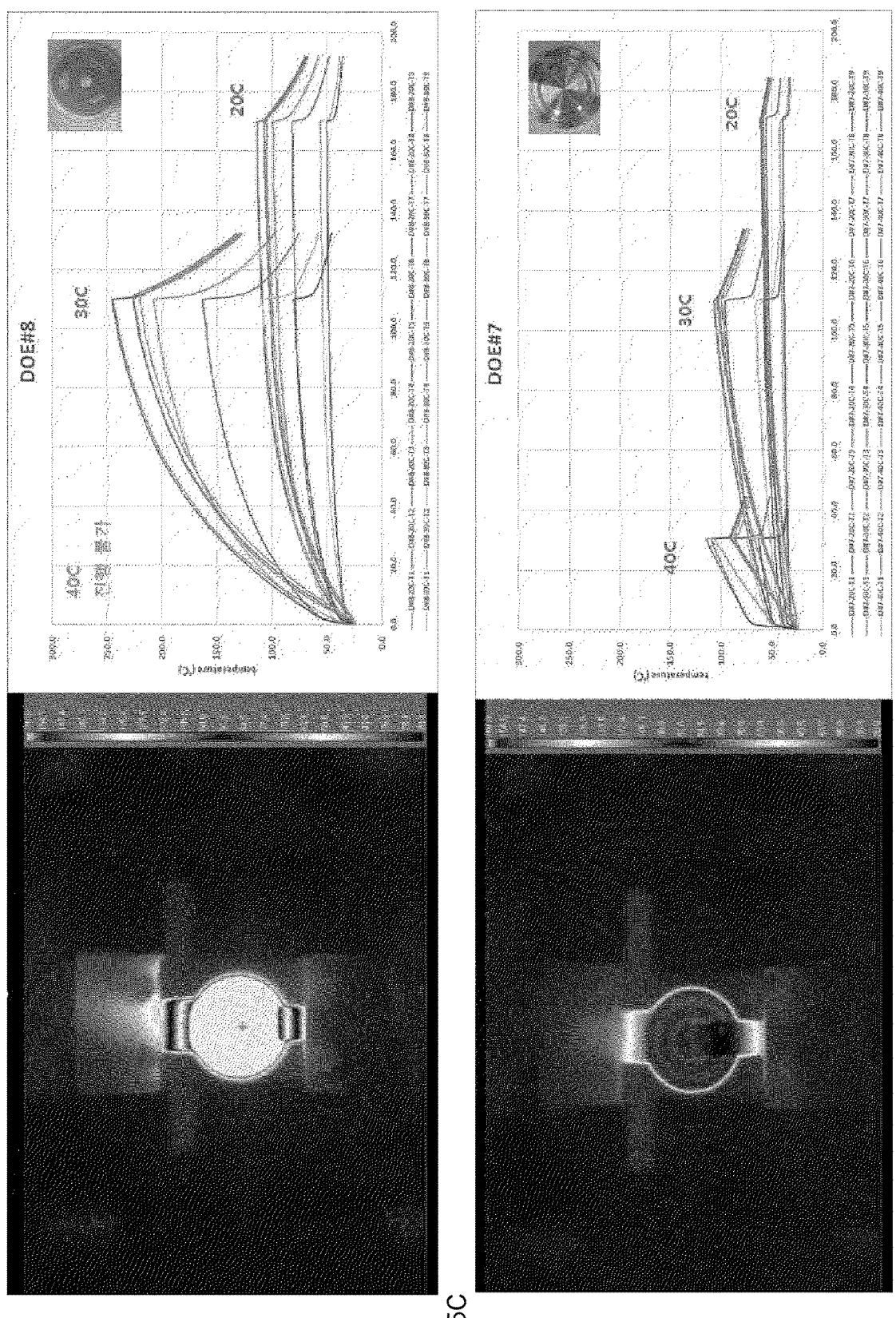

In the cap assembly 10, the current path may be connected to the cap-down 14, the sub plate 15, the safety plate 12 and the cap up 11 through the pack tab (PT) in the positive tab (ET). That is, since the positive electrode tab ET and the pack tab PT are electrically connected through four components (the cap-down 14, the sub plate 15, the safety plate 12, and the cap-up 11), the current path becomes longer, and thus the resistance of the current path may increase, resulting in increased heat generation. FIG. 5B is a graph illustrating the result of measuring the heating state of the cap assembly of Comparative Example and a temperature change according to current. As shown in FIG. 5B, it can be seen that when the current is 30 C, the heating temperature of the cap assembly 10 of Comparative Example is measured up to 246 degrees. In addition, when the current is 40 C, the heating temperature of the cap assembly 10 of Comparative Example was extremely high, and thus the progress of temperature measurement was unfeasible.

In addition, FIG. 5C is a graph illustrating the result of measuring the heating state of the secondary battery 100 shown in FIGS. 1A to 4 by using a thermal imaging camera and a temperature change according to current. As shown in FIG. 5C, it can be seen that when the current is 40 C, the heating temperature of the cap-up of the secondary battery of the present invention is measured up to 107 degrees.

That is, in the secondary battery 100 of the present invention, the positive electrode tab 125 and the pack tab PT are connected by the cap-up 141 without any other configuration, and thus heat generation due to the resistance of the current path is reduced compared to Comparative Example.

Figure 6:
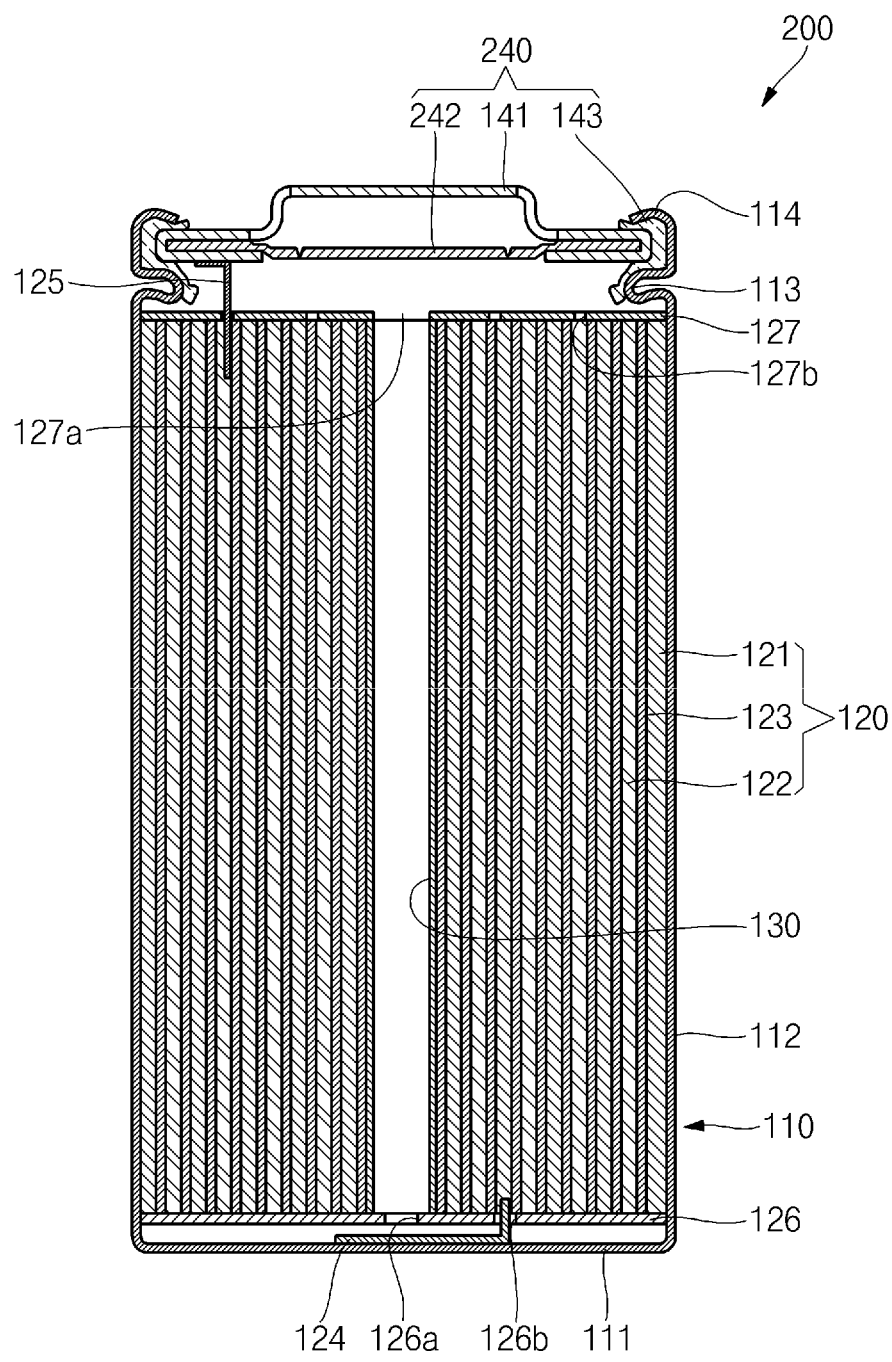
FIG. 6 is a cross-sectional view illustrating a secondary battery according to another embodiment of the present invention.

Referring to FIG. 6, a cross-sectional view illustrating a secondary battery 200 according to another embodiment of the present invention is illustrated.

As shown in FIG. 6, the secondary battery 200 according to the present invention includes a cylindrical can 110, an electrode assembly 120 accommodated in the cylindrical can 110, and a cap assembly 240 that seals an upper opening of the cylindrical can 110. In addition, the present invention may further include a center pin 130 coupled to the electrode assembly 120.

The configurations of the cylindrical can 110, the electrode assembly 120, and the center pin 130 of the secondary battery 200 are the same as those of the secondary battery 100 illustrated in FIGS. 1A and 1B, and in the configuration of the cap assembly 240, the configurations of the cap-up 141 and the insulating gasket 143 are the same as those of secondary battery 100 illustrated in FIGS. 1A and 1B.

Accordingly, the following description will focus on the safety plate 242 of the secondary battery 200, which is different from the corresponding element of the secondary battery 100.

Figure 7:
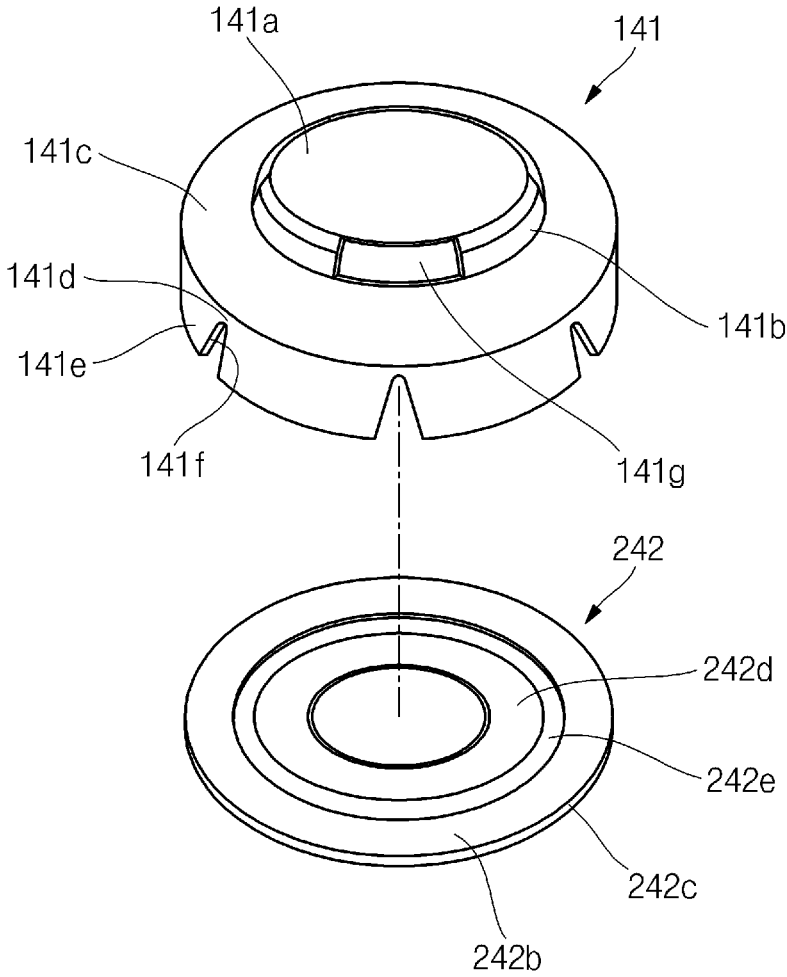
FIG. 7 is an exploded perspective view illustrating an enlarged view of a cap assembly of the secondary battery shown in FIG. 6 before a cap-up and a safety plate are coupled.
Figure 8A:
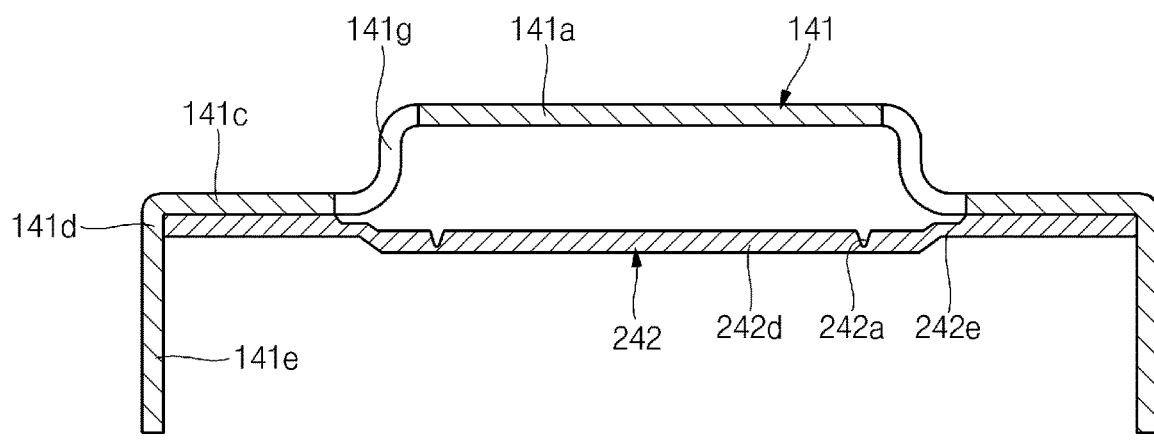
FIGS. 8A and 8B are a cross-sectional view in which the safety plate is inserted into the cap-up shown in FIG. 7 and a cross-sectional view in which the cap-up and the safety plate are coupled.

In addition, referring to FIG. 7, an exploded perspective view illustrating an enlarged view of a cap assembly 240 of the secondary battery 100 shown in FIG. 6 before a cap-up 141 and a safety plate 242 are coupled is illustrated. Referring to FIG. 8A, a cross-sectional view in which the safety plate 242 is inserted into the cap-up 141 shown in FIG. 7 is illustrated, and referring to FIG. 8B, a cross-sectional view in which the cap-up 141 and the safety plate 242 are coupled is illustrated.

Figure 8B:
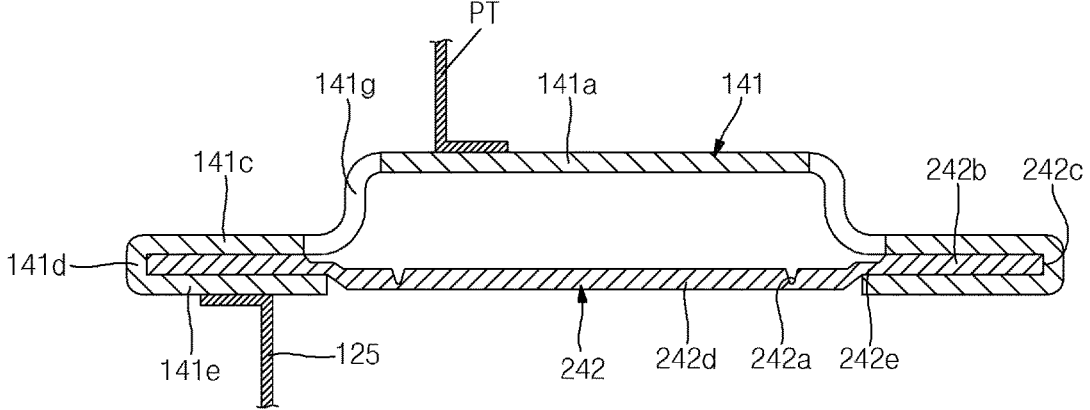

Hereinafter, the configuration and coupling relationship of the cap-up 141 and the safety plate 242 will be described with reference to FIGS. 7, 8A and 8B.

The safety plate 242 may include a central portion 242*d*, a step portion 242*e*, and an edge portion 242*b* sequentially positioned in an outward direction from the center.

The central portion 242*d* is approximately flat and may be located approximately at the center of the safety plate 242. Also, the central portion 242*d* may be located under the terminal portion 141*a* of the cap-up 141.

In addition, the central portion 242*d* may include a vent 242*a*, which is a groove formed in the downward direction from an upper surface. The region where the vent 242*a* is formed may have a smaller thickness than other portions of the safety plate 242. The vent 242*a* may be formed in a circular ring on the approximately central portion of the safety plate 142. The vent 242*a* may be located under the cap-up 141. When the pressure inside the cylindrical can 110 increases due to an internal short circuit or overcharge/discharge, the vent 242*a* may be ruptured by the pressure. The safety plate 242 may release the internal gas through the opening 141*g* of the cap-up 141 to the outside while the vent 242*a* is torn by the internal pressure of the cylindrical can 110.

The stepped portion 242*e* may be bent upwardly from an edge of the central portion 242*d*. In addition, the stepped portion 242*e* may connect the central portion 242*d* and the edge portion 242*b*. Due to the stepped portion 242*e*, stress against the rupture of the vent 242*a* may be reduced.

The edge portion 242*b* may extend outwardly from an upper end of the step portion 242*e*. The edge portion 242*b* may be interposed between the first extension portion 141*c* and the second extension portion 141*e*. In addition, the edge portion 242*b* may have an upper surface, a side surface, and a lower surface surrounded by the first extension portion 141*c*, the bent portion 141*d*, and the second extension portion 141*e*.

While the foregoing embodiment has been described to practice the secondary battery of the present invention, it will be understood by those of ordinary skill in the art that various changes in form and details may be made therein without departing from the spirit and scope of the present disclosure as defined by the following claims.

INDUSTRIAL APPLICABILITY

Various embodiments of the present invention relate to a secondary battery.

The invention claimed is:
1. A secondary battery comprising:
a cylindrical can having an upper end opening;
an electrode assembly received in the cylindrical can and having an electrode tab; and
a cap assembly for sealing the upper end opening of the cylindrical can,
wherein the cap assembly includes:

a circular-plate-shaped safety plate; and
a cap-up disposed on an upper portion of the safety plate and surrounding an edge portion of the safety plate,
wherein the cap-up comprises:
a terminal portion having a shape of a flat circular plate;
a connection portion that is bent downwardly from a second edge portion of the terminal portion;
a first extension portion that extends outwardly from a lower end of the connection portion in a horizontal direction;
a bent portion that is bent downwardly from an edge of the first extension portion; and
a second extension portion that extends inwardly from a lower end of the bent portion in the horizontal direction, the second extension portion including an upper surface and a lower surface extending in the horizontal direction;
wherein the electrode tab is in contact with and coupled to the lower surface of the second extension portion of the cap-up,
wherein the cap assembly further comprises an insulating gasket interposed between the cap-up and the cylindrical can,
wherein the second extension portion extends further toward the center of the safety plate than the insulating gasket.

2. The secondary battery of claim 1, wherein the edge portion of the safety plate has an upper surface in contact with the first extension portion, a side surface in contact with the bent portion, and a lower surface in contact with the second extension portion.

3. The secondary battery of claim 1, wherein the edge portion of the safety plate is interposed between the first extension portion of the cap-up and the second extension portion parallel to the first extension portion.

4. The secondary battery of claim 1, wherein the second extension portion includes a plurality of slits that are cut from the upper end to the lower end.

5. The secondary battery of claim 1, wherein the safety plate has a circular ring-shaped groove in which a vent is located under the terminal portion and is formed in a downward direction from a top surface of the safety plate.

6. The secondary battery of claim 1, wherein the connection portion has at least one opening.

7. The secondary battery of claim 1, wherein the electrode tab is welded to the second extension portion.

8. The secondary battery of claim 1, wherein the safety plate comprises:
a central portion that has a flat circular plate shape and includes a vent formed on the upper surface thereof;
a stepped portion that is bent upwardly from an edge of the central portion; and
a third edge portion that extends outwardly from an upper end of the stepped portion.

* * * * *